June 2, 1970
R. V. POLE
3,515,452
FORMING A HOLOGRAM OF A SUBJECT RECORDED ON AN INTEGRAL
PHOTOGRAPH WITH INCOHERENT LIGHT
Filed June 20, 1966
4 Sheets-Sheet 1
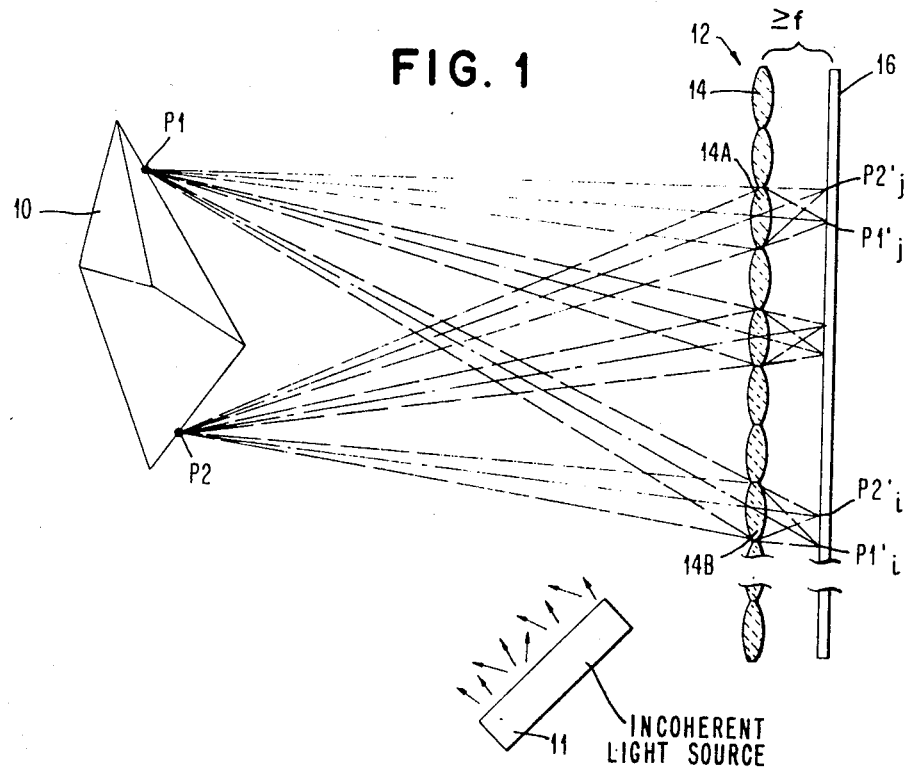
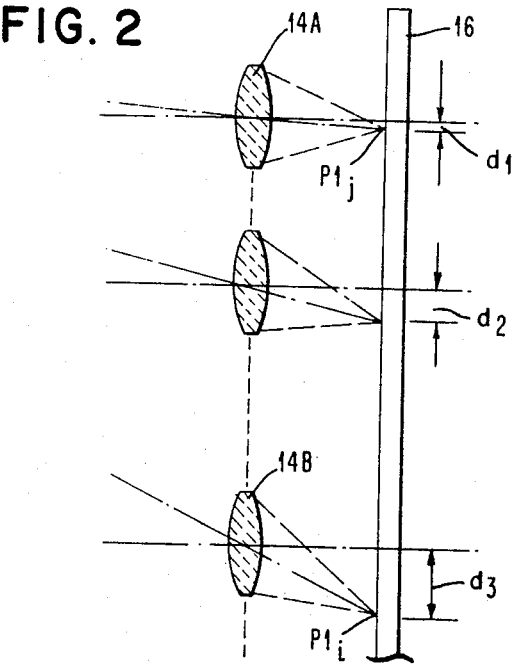
INVENTOR
ROBERT V. POLE
BY John J. Goodwin
ATTORNEY June 2, 1970  R. V. POLE  3,515,452
FORMING A HOLOGRAM OF A SUBJECT RECORDED ON AN INTEGRAL
PHOTOGRAPH WITH INCOHERENT LIGHT
Filed June 20, 1966  4 Sheets-Sheet 2

$n_1 > n_2$
$n_3 > n_2$

United States Patent Office 3,515,452
Patented June 2, 1970

3,515,452
FORMING A HOLOGRAM OF A SUBJECT RECORDED ON AN INTEGRAL PHOTOGRAPH WITH INCOHERENT LIGHT
Robert V. Pole, Yorktown Heights, N.Y., assignor to International Business Machines Corporation, Armonk, N.Y., a corporation of New York
Filed June 20, 1966, Ser. No. 558,871
Int. Cl. G02b 27/22
U.S. Cl. 350—3.5
4 Claims

ABSTRACT OF THE DISCLOSURE

A hologram of a subject is formed by first recording the wavefronts reflected from a subject illuminated by incoherent light on a Lippmann or integral photograph. This is done by exposing a photographic emulsion sheet located in the image plane of a fly's eye lens array. The photographic sheet is developed and in combination with the fly's eye lens array is used as the object to produce a hologram. The resultant hologram reconstructs a three-dimensional image of the original subject.

---

A hologram is the name given to a photographic film having an interference pattern recorded thereon. The interference pattern is produced by a source of coherent light which is split into two beams, one of which is directed onto the sheet of photographic film, and the other of which is directed onto a subject. The beam directed onto the subject is scattered and reflected onto the sheet of film with waves of varied orientation and wavefront curvature. The scattered light waves and the undisturbed beam are reunited at the film where they interfere as patterns of light and dark areas which are photographically recorded.

When a source of coherent light is directed through the patterned film sheet, it is diffracted into a number of diffraction orders. At least one of these diffraction orders duplicates the waves that were originally reflected from the subject, and a person viewing the film sees the subject of the hologram in three dimensions, with the subject appearing behind the hologram at a distance equal to the original subject to film distance. If the viewer changes his position and views the hologram from a different angle, the three dimensional perspective changes and the viewer may thus look around an object in the foreground to see an object behind it. If the reference beam is supplied from the back of the holographic plate, a hologram is obtained consisting of multiple layers, each layer corresponding to an antinode of the standing wave pattern established by the subject and reference beams traveling in opposite directions. Such a hologram can be viewed on reflection in incoherent or white light since the multiple layers will reflect only one color toward the eye of the observer. If three primary color laser lights are used during recording, a three color natural light holographic reconstruction will result. A full treatise on basic holography is given in the book, "An Introduction to Coherent Optics and Holography" by George W. Stroke, copyright 1966 by Academic Press Inc., Library of Congress Catalog Card No. 65-28633.

Heretofore, the production of a hologram required that the subject be illuminated with highly coherent light, the presently most acceptable source of coherent light being the laser. The requirement that a laser beam be provided for producing the hologram presents many drawbacks. A laser is relatively expensive and its beam may be injurious to a human subject. Also, hologram making process requires equipment of interferometric precision. Further, the requirement that a laser be available limits the possible subjects for the hologram. It would be much more preferable if a hologram could be made with incoherent or white light such as sunlight or readily available artificial illumination. It would also be desirable to provide, with the incoherent illumination, a photographic master recording of the subject from which a large number of identical holograms could be easily produced. The present invention accomplishes these and other objectives as follows.

It is an object of the present invention to provide a method of producing a three dimensional hologram viewable either in laser or white light using incoherent illumination of the subject.

Another object of the present invention is to provide a method of producing a photographic recording of wavefront samples of a subject from which a real image of the subject can be projected with incoherent or coherent light, or from which a hologram of the subject can be produced.

A further object of the present invention is to provide a system for making a hologram using incoherent illumination of the subject.

Still another object of the present invention is to provide a system for photographically recording wavefront sampling points of a subject from which a real image of the subject can be projected with incoherent or coherent light or from which a hologram can be made.

A still further object of the present invention is to provide an optical device incorporating photographically recorded samples of electromagnetic wavefronts.

Another object of the present invention is to provide an optical device as descrbied including in a single construction an associated lens array.

The foregoing and other objects, features and advantages of the invention will be apparent from the following more particular description of preferred embodiments of the invention, as illustrated in the accompanying drawings.

In the drawings:

FIG. 1 is a schematic drawing illustrating the elements and method for photographically recording the electromagnetic wavefronts from a subject illuminated with incoherent light following the principles of the present invention.

FIG. 2 is a detailed side view of a portion of the lens array depicted in FIG. 1.

Prior to providing a detailed description of the present invention, some background information related to holography will be discussed. Holography is the name suggested as the description for a process where holograms are used as aids of image formation. Another term employed is wavefront reconstruction imaging wherein wavefront reconstruction refers to a process in which the amplitude and phase of a scattered electromagnetic wavefront is recorded (e.g., photographically) together with a suitable coherent background in such a way that it is possible to produce at a later time a reproduction of the electromagnetic field distribution of the original wavefront. The coherent background is necessary for the recording of the negative and complex values of the electric field distribution on the hologram.

The scattered electromagnetic wavefront is obtained by scattering of coherent light directed onto a subject and the amplitude and phase of the scattered electromagnetic wavefront is a function of the position and geometry of the subject. The electromagnetic wavefront interferes with the coherent background at the photographic plate, and the interference causes fringe patterns which are recorded. The fringe patterns are a function of the angles between the scattered wavefront and the coherent background. The photographic recording is the hologram, and when a coherent light source is directed through the hologram a virtual three dimensional image of the subject is produced having perspective.

If the coherent background is applied to one side of the photographic plate and the scattered wavefront from the subject is applied to the other side of the photographic plate, a number of layers of holographic interference patterns are produced in the emulsion of the film. When ordinary white light is directed at the hologram, a three dimensional image is produced on reflection at Bragg's angle. This type of technique will be referred to as the Lippmann-Bragg method and is described in the article, "Three New Advances in Optical Holography" by G. W. Stroke in WB14, Bulletin of the Optical Society of America, March 1966, and in Physics Letters, Vol. 20, No. 4, Mar. 1, 1966 in the article, "White Light Reconstruction of Holographic Images Using the Lippmann-Bragg Diffraction Effect" by G. W. Stroke and A. E. Labeyrie.

In the present invention the wavefront from the subject will be produced by incoherent or white light, and the wavefront is recorded photographically in coded form on a simple optical device. The optical device, having a stored version of the wavefront in coded form, can be employed in two ways. First, either white light or coherent light can be directed through the optical device to form a real image of the subject on a screen, and secondly, the optical device can be used to produce either of the above two described holograms, that is, a hologram viewable in coherent light, or a hologram viewable in incoherent light.

Figure 3:
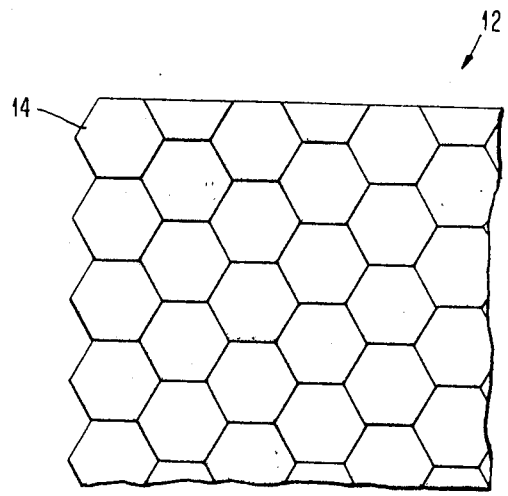
FIG. 3 is a detailed front view of a portion of a lens array depicted in FIG. 1.

Referring to FIG. 1, a schematic drawing is provided to illustrate the manner in which a stored representation of the wavefront from a subject is recorded. The subject 10 is illuminated with incoherent or white light from source 11. For purposes of explanation only two points P1 and P2 on the subject 10 will be discussed, however it is understood that what is true for points P1 and P2 is true for all points on the subject 10 reflecting a wavefront onto the optical device. In FIG. 1 the optical device is shown including what is known as a fly's eye lens sheet 12 consisting of a plurality of small lenses 14 located in front of a photographic emulsion 16 of the black and white type, or alternatively, the emulsion can be a color emulsion as will be later described. FIG. 3 shows a front portion of sheet 12 wherein the lenses 14, which are preferably hexagonal, form a closely spaced array. If close spacing were not possible, for example if round lenses were used, the spaces between the lenses would have to be made opaque, or else an apertured plate would have to be positioned in front of the lens array.

Referring again to FIG. 1, the photoemulsion sheet 16 is positioned behind lens sheet 12 in the image plane of the subject 10 at a distance equal to or greater than "$f$" where "$f$" is the focal length of the lenses 14. The scattered wavefront from the subject 10 will be recorded on the emulsion sheet 16, that is, the curvature, the orientation of the curvature, and the intensity of each point of the subject with respect to the plane of the emulsion sheet 16 will be recorded in the form of a plurality of samples spatially distributed on the emulsion sheet 16 by operation of the plurality of lenses. Thus, the curvature, orientation of curvature, and intensity of point P1 is recorded on the photographic emulsion 16 in terms of points $P1'_i$ through $P1'_j$ and point P2 in terms of points $P2'_i$ through $P2'_j$. Referring to FIG. 2 which shows lenses 14A and 14B of FIG. 1, it is seen that the points $P1'_i$ and $P1'_j$ correspond to point P1 of the object recorded on locations of the photographic plate 16 with respect to the center line of lens 14A and the center line of 14B as shown by distances $d_1$ and $d_3$. Likewise the points $P2'_i$ and $P2'_j$ are positioned at different distances (on photographic plate 16) from the center lines of lenses 14A and 14B, respectively. Likewise all the points of the wavefronts from the subject are recorded at different points on the emulsion areas behind all the separate lenses of sheet 12 to provide an overall spatial pattern of samples of the wavefronts from subject 10 on emulsion sheet 16. In other words the curvature of the wavefront emerging from any point P on the object as well as the absolute orientation of that curvature with respect to the curvature of the emulsion 16 are uniquely recorded in the form of a series of points, each point having an appropriate relative position with respect to the axis of the lens to which it belongs. The transmitivity of these points on the developed emulsion sheet 16 carry the information about the brightness of the corresponding point on the object. Since this is so for all points on the object the developed emulsion sheet 16 will carry all the information necessary to reconstruct the holographic image of the three dimensional object.

Figure 4:
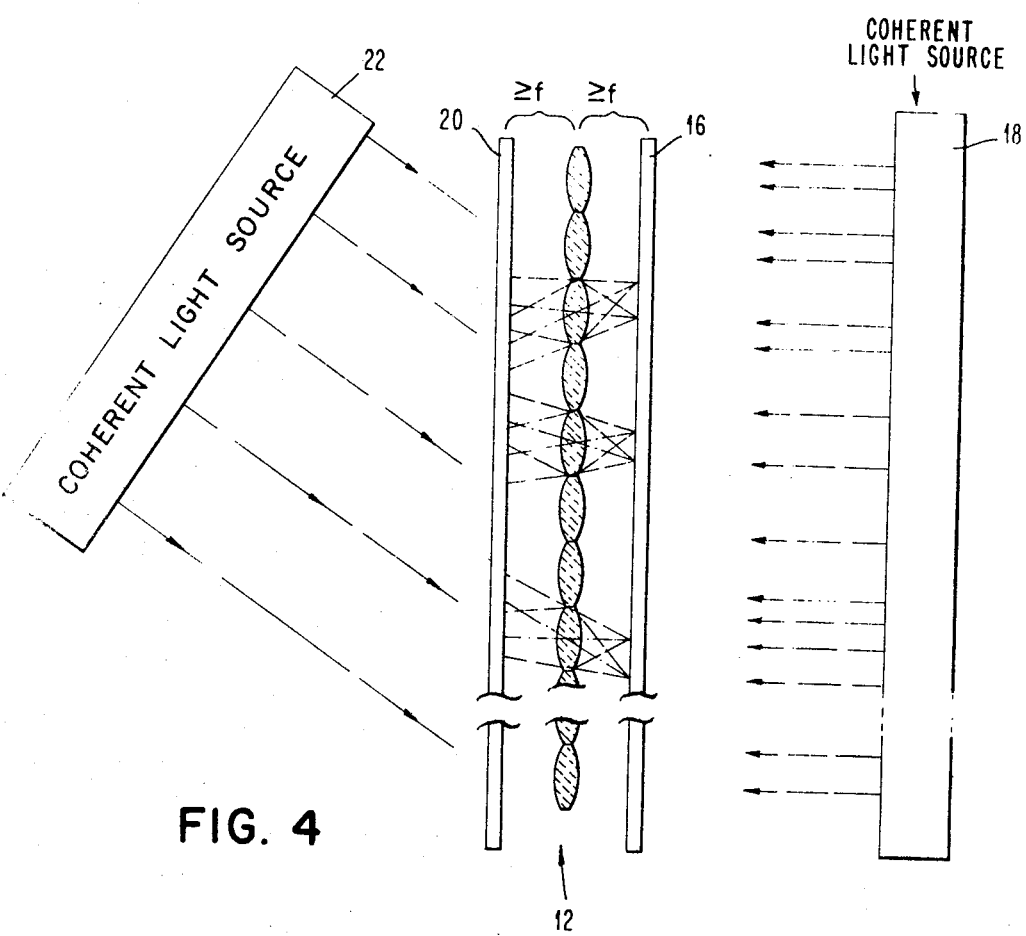
FIG. 4 is a schematic diagram of one system for producing a hologram viewable on reflection and in incoherent or white light using the recorded wavefront storage device of FIG. 1.

After exposure to the subject, the emulsion sheet 16 is developed by a conventional photographic reversal process so that a photographic positive is obtained consisting of a plurality of variably transparent points. The photograph thus produced is known in the art as an integral photograph or a Lippmann photograph. The method for forming a photograph of this type is discussed in the article "Photography. Reversible Pictures. Integral Photographs" by G. Lippmann and Comptes Rendus 146, pp. 446–451, Mar. 2, 1908 and Science Abstracts, vol. XI, pp. 275–276, 1908. Integral Photographs are also described in the article "Optical Properties of a Lippmann Lenticulated Sheet" by Herbert E. Ives, Journal of the Optical Society of America, vol. 21, March 1931, pp. 171–176. This photographic record of the subject wavefronts may now be employed to produce a hologram. Referring to FIG. 4, the lens sheet 12 and the developed emulsion sheet 16 are placed proximate to a source of coherent light 18 (which may be a laser) and the coherent light beam passes through emulsion sheet 16 and lens sheet 12 onto another undeveloped photographic plate 20 which is located a distance equal to or greater than "$f$" from lens sheet 12. The emulsion itself provides scattering necessary to fill the apertures of individual lenses, but it may be desirable to provide a larger amount of scattering, for example by a sheet of frosted glass, between the light source and the emulsion sheet 16. A reference beam of coherent light is directed onto the other side of photographic plate 20 from source 22. The result is that a hologram is produced by the interference at photographic plate 20 between a reconstructed subject wavefront produced by the illumination of the stored wavefront samples on emulsion sheet 16 directed through lens sheet 12, and the coherent reference beam from source 22. The resultant hologram produced is the same as would have been produced using the subject directly. That is, when the hologram is viewed, it provides an image of the original subject rather than sheet 16 and lens array 12 which were used to form the hologram. It is to be noted that the subject is not required in producing the hologram on plate 20 from emulsion sheet 16 as shown in FIG. 4. It is to be further noted that the hologram on plate 20 was produced using the Lippmann-Bragg diffraction effect characterized by applying the reference beam to the opposite side of the plate 20. This produces a hologram which can be viewed using white light as described in the article in Physics Letters previously cited.

Figure 5:
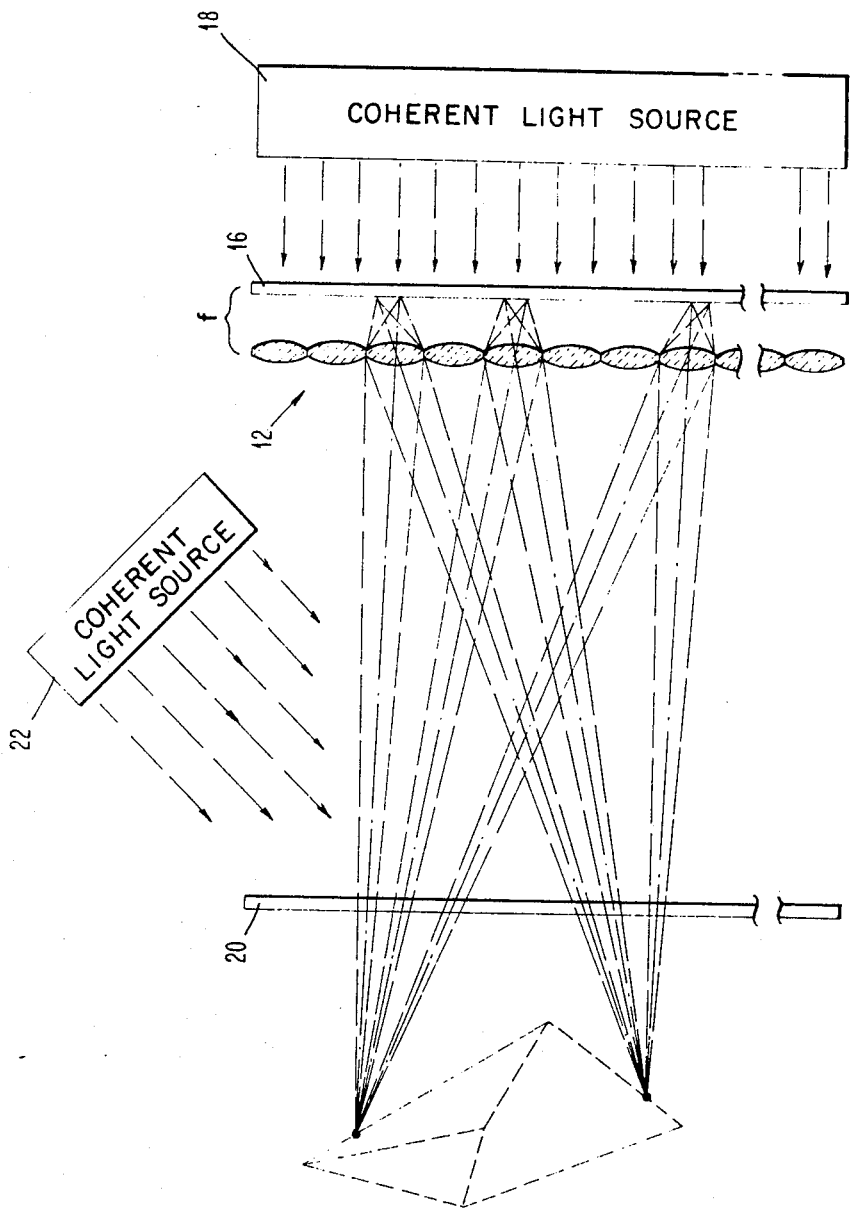
FIG. 5 is a schematic diagram of another system for producing a hologram viewable in coherent light using the recorded wavefront storage device of FIG. 1.

Referring to FIG. 5, an alternate way of generating a hologram from the stored wavefront images on emulsion sheet 16 is depicted. In this instance the coherent reference beam is applied to the same side of photographic plate 20 as the illumination through the emulsion sheet 16, the photographic plate 20 being positioned a distance from lens sheet 12 which is less than the distance at which the original subject was located when emulsion sheet 16 was exposed (see FIG. 1). In FIG. 5 a real image of the original subject (shown in dotted lines) is directed through photographic plate 20 where the intermediate optical field interferes with the coherent reference source to produce the hologram. The hologram produced in FIG. 5 is viewable only in coherent light, and therefore the method shown in FIG. 5 is not necessarily preferred to that of FIG. 4 and is shown in the interests of providing a complete disclosure of the present invention.

Figure 6:
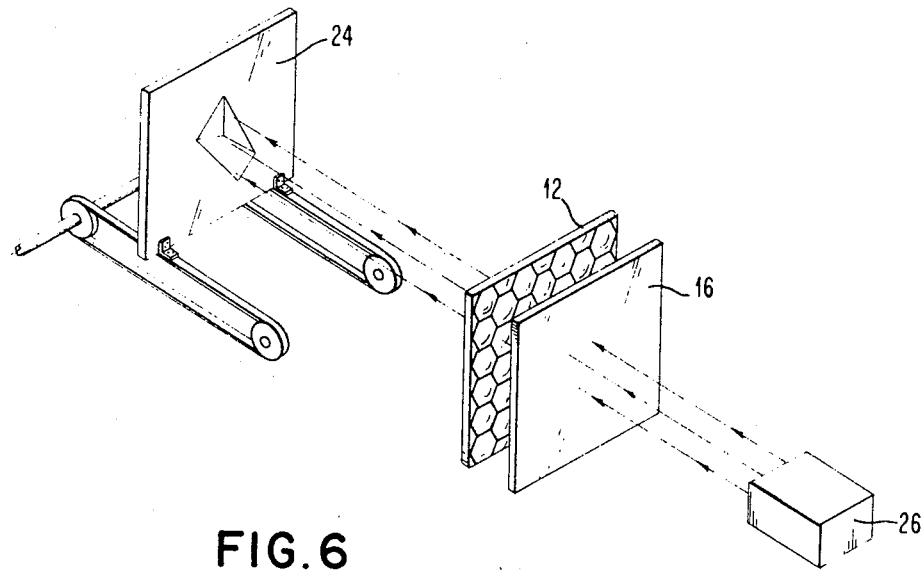
FIG. 6 is a schematic diagram of a system for projecting a real image with the recorded wavefront storage device of FIG. 1.

FIGS. 4 and 5 illustrate how the wavefront information photographically stored on emulsion sheet 16 can be employed to produce a hologram viewable either in white light (FIG. 4) or in coherent light (FIG. 5). In the description of FIG. 5 it was stated that directing coherent light through the developed emulsion sheet 16 produced a real image at a distance from lens sheet 12 equal to the distance the original subject was located (in FIG. 1). Another important feature of the use of the developed emulsion 16 is shown in FIG. 6. In FIG. 6 a projection screen 24 is placed at the area where the real image of the subject appears, the real image of the subject appears on the screen having three dimensional properties when the emulsion sheet and lens sheet have incoherent or ordinary white light from source 26 directed through them. Thus, the developed emulsion and lens sheet can be employed as a three dimensional projection slide. The projection screen is made movable so that it can be located in various cross sections of the three dimensional image. As the projection screen is moved back and forth, different cross sections of the image are in focus and are observable. Another way of observing the three dimensional real image is to project it into a box containing a low absorption scatterer such as smoke or other dense gas. It is seen therefore that the stored wavefront emulsion sheet 16 can be either used to produce holograms as shown in FIGS. 4 and 5, or it can be used to project real three dimensional images of the subject using either coherent or incoherent light as shown in FIG. 6.

Figure 7:
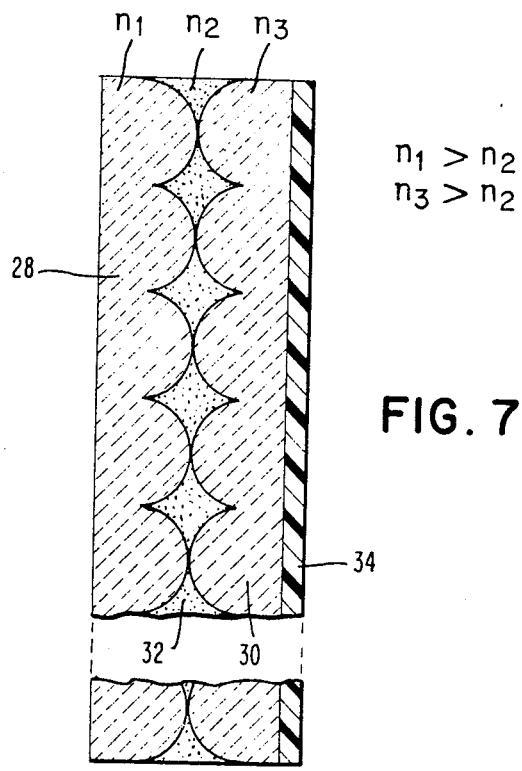
FIG. 7 is a schematic drawing of an improved optical device which can be used for photographically recording the electromagnetic wavefronts from a subject illuminated with incoherent or white light.

Referring to FIG. 7, an improved device for storing the wavefront information from a subject is shown. In FIG. 7 a first fly's eye lens sheet 28 and a second fly's eye lens sheet 30 are arranged in opposed fashion, in contact with each other, and a single structure is produced by bonding the two lens sheets together with a clear lower index refraction epoxy binder 32. The use of two lens sheets improves the overall optical qualities. The index of refraction of the lenses of sheets 28 and 30 are $n_1$ and $n_3$, respectively, and the index of refraction of the binder is $n_2$, and $n_1 > n_2$ and $n_3 > n_2$. An emulsion sheet is mounted on the back of the lens pair. Lens and emulsion sheet structure of FIG. 7 can be exposed as shown in the system of FIG. 1, and after exposure the emulsion sheet is developed and remounted on the lens pair and can be used to form a hologram as shown in the systems of FIGS. 3 and 4, or to form a real image as shown in the system of FIG. 5.

The production of holograms in natural colors is known in the art. The article, "Recent Advances in Multicolor Waveform Reconstruction" by A.A. Friesem and R. J. Fedorowicz in Applied Optics, Vol. 5, No. 6 (June 1966) and the article in Applied Physics Letters, Vol. 7, page 56 (1965) by K. S. Pennington and L. H. Lin describe this technology. This invention is equally applicable to production of three dimensional holograms in natural colors. In order to accomplish this it is only necessary that the emulsion sheet 16 (FIG. 1) be a reversible color emulsion sheet such as Eastman-Kodak Kodachrome film so that the individual images under the fly's eye lens sheet 12 are recorded in three primary colors. After such an exposed emulsion is developed in reversal (as a positive) the hologram can be made on a black and white emulsion exactly as described in FIG. 1 except that the exposure has to be made with three coherent light sources in succession, the three sources supplying coherent light of three additive primary colors. Since in this case a hologram viewable in white light is preferable, the reference beams will always be supplied from the back. This is possible with the structure of FIG. 4 by selecting the coherent sources 10 and 22 from a multicolor laser such as an ionized noble gas laser which is equipped with filters for producing red, green and blue beams in succession.

In conclusion, improved optical devices and methods for making holograms of three dimensional objects have been described. A unique device for storing wavefront samples and methods of making such a unique device have been provided. The unique optical storage device may be employed for purposes of forming holograms or for the display of real images. It is to be noted that the invention was described in relation to three dimensional objects, however two dimensional objects, such as printed materials, being special cases of three dimensional objects, may also be used as subjects if desired. It should be further understood that certain of the elements of the present invention were schematically depicted, and that known techniques can be employed to accomplish the function. In particular a single illuminating source (i.e., laser or the like) is generally employed with beam splitting and reflecting prisms to produce the necessary plurality of light paths.

While the invention has been particularly shown and described with reference to preferred embodiments thereof, it will be understood by those skilled in the art that various changes in form and details may be made therein without departing from the spirit and scope of the invention.

What is claimed is:
1. A method of making a hologram of a subject illuminated by incoherent light comprising the steps of:
(step 1) recording the electromagnetic wavefronts reflected from a three-dimensional subject illuminated by incoherent light as an integral photograph by exposing a sheet of photographic emulsion to said wavefronts through a fly's eye lens array, said subject being located at a distance from a first side of said fly's eye lens array and said photographic emulsion sheet being located parallel to said fly's eye lens array in the image plane of said subject on the other side of said fly's eye lens array,
(step 2) developing said exposed photographic emulsion sheet,
(step 3) directing a first beam of coherent light through said developed photographic emulsion sheet and then through said lens array onto a second sheet of photographic emulsion, said developed photographic emulsion sheet being located in the same position relative to said fly's eye lens array as said emulsion sheet in step 1 and said second photographic emulsion sheet being located on said first side of said fly's eye lens array and parallel to said lens array at a distance less than said original subject distance of step 1,
(step 4) simultaneously with directing said first coherent beam, directing a second beam of coherent light mutually coherent with said first beam directly onto said second photographic emulsion sheet, and
(step 5) developing said exposed second photographic emulsion sheet to form a hologram of said subject.
2. A method of making a hologram of a subject illuminated by incoherent light according to claim 1 wherein said first beam of coherent light is directed through said developed photographic emulsion sheet and said lens array onto a first side of said second photographic emulsion sheet and wherein said second beam of coherent light is directed onto a second side of said photographic emulsion sheet.

3. A method of making a hologram of a subject comprising the steps of:
(step 1) illuminating a three-dimensional subject with incoherent light to produce reflected electromagnetic wavefronts from said subject,
(step 2) recording the electromagnetic wavefronts reflected from said subject as an integral photograph by exposing a sheet of photographic emulsion to said wavefronts through a fly's eye lens array, said subject being located at a distance from a first side of said fly's eye lens array and said photographic emulsion sheet being located parallel to said fly's eye lens array in the image plane of said subject on the other side of said fly's eye lens array,
(step 3) developing the exposed photographic emulsion sheet,
(step 4) directing a first beam of coherent light through said developed photographic emulsion and then through said lens array onto a second sheet of photographic emulsion, said developed photograph emulsion being located in the same position relative to said fly's eye lens array as said emulsion sheet in step 1 and said second photographic emulsion being located on said first side of said lens array and parallel to said lens array at a distance less than said original subject distance of step 1,
(step 5) simultaneously with directing said first coherent beam, directing a second beam of coherent light mutually coherent with said first beam directly onto said second photographic emulsion, and
(step 6) developing said exposed second photographic emulsion sheet to form a hologram of said subject.

4. A method of making a hologram of a subject according to claim 1 wherein the image plane of the subject in step 1 coincides with the focal plane of the fly's eye lens array.

References Cited

UNITED STATES PATENTS 2,361,390 10/1944 Ferrill _____ 350—144
3,155,764 11/1964 Gill _____ 350—106

FOREIGN PATENTS 852,587 10/1960 Great Britain.

OTHER REFERENCES

Ives, Jour. of the Optical Soc. of Am., vol. 21, March 1931, pp. 171–176.

Pennington et al., Applied Physics Letters, vol. 7, No. 3, August 1965.

Stroke et al., Physics Letters, vol. 20, No. 4, March 1966.

DAVID SCHONBERG, Primary Examiner

R. J. STERN, Assistant Examiner

U.S. Cl. X.R.

350—130, 167